United States Patent [19]

Nagai et al.

[11] Patent Number: 4,596,317
[45] Date of Patent: Jun. 24, 1986

[54] DISC BRAKE PISTON AND BRAKE PAD ASSEMBLY

[75] Inventors: Steve S. Nagai, West Carrollton, Ohio; Robert M. Carpenter, Rochester Hills, Mich.

[73] Assignee: General Motors Corporation, Detroit, Mich.

[21] Appl. No.: 691,199

[22] Filed: Jan. 14, 1985

[51] Int. Cl.[4] .............................................. F16D 65/02
[52] U.S. Cl. ...................... 188/72.4; 92/84; 92/249; 188/73.38; 188/250 G
[58] Field of Search ............ 188/72.4, 72.5, 370, 188/71.6, 73.38, 73.37, 73.1, 205 A, 250 E, 250 F, 250 G, 250 B, 264 G, 71.1, 234, 218 A, 218 R; 192/30 V, 85 AA, 70.11, 112, 113; 277/237 A; 92/84, 137, 140, 249, 256

[56] References Cited

U.S. PATENT DOCUMENTS

| | | | |
|---|---|---|---|
| 3,387,687 | 6/1968 | Eggstein et al. | 188/72.4 |
| 4,186,824 | 2/1980 | Preston et al. | 188/73.38 |
| 4,235,314 | 11/1980 | Reagan | 188/73.38 |
| 4,313,527 | 2/1982 | Pickel | 188/73.1 |
| 4,401,012 | 8/1983 | Emmett | 92/249 X |
| 4,512,446 | 4/1985 | Chuwman et al. | 188/264 G X |
| 4,513,844 | 4/1985 | Hoffman, Jr. | 188/71.6 |

*Primary Examiner*—Douglas C. Butler
*Attorney, Agent, or Firm*—D. D. McGraw

[57] ABSTRACT

A planar body spring attaches the inboard shoe and lining assembly to the piston of a disc brake caliper. The spring also serves as a shield for the piston boot seal.

3 Claims, 5 Drawing Figures

DISC BRAKE PISTON AND BRAKE PAD ASSEMBLY

The invention relates to disc brakes, and more particularly to a disc brake piston and brake pad assembly used in a disc brake caliper. The assembly uses a planar body spring and a bayonet joint connection between the spring body and the outer end of the piston to quickly but firmly attach the spring to the piston. The spring is provided with tabs which act as retainers for the backing plate of the inboard brake pad assembly. The tabs permit easy installation and removal of the brake pad assembly from the piston while, at the same time, firmly positioning and holding the brake pad assembly in proper position in relation to the piston. The invention prevents inboard brake shoe and lining rattle in the caliper housing, which is often noticeable on rough roads when brake pad assemblies are not firmly attached. The planar body of the spring also acts as a shield for the piston boot seal. It reflects heat from the inboard shoe and the disc being braked so as to reduce the temperature of the boot seal, contributing to longer boot seal life. It also protects the boot seal from flying debris such as gravel.

The piston and the planar body spring may be preassembled. The spring is oriented so that the bayonet joint tabs of the spring are lined up with slots in the bayonet joint portion of the outer end of the piston. The spring is then rotated about 90° so that the firm bayonet joint attachment is completed. In initial assembly of the disc brake caliper assembly, the brake pad assembly may be preassembled to the spring and piston subassembly. This is accomplished by sliding one edge of the backing plate of the brake pad assembly under one set of tabs extending outwardly from the spring planar body on the side thereof to which the brake pad assembly is to be attached, then pivoting the brake pad assembly so that another set of tabs engage the opposite edge of the brake pad assembly backing plate retaining the backing plate and therefore the entire brake pad assembly in position against the outer end of the piston so that braking forces may be transmitted from the piston to the brake pad assembly. The edge sections of the brake pad assembly backing plate which are engaged by the spring tabs are provided with ramps which cooperate with the ends of the tabs and assist in providing a firm gripping action. When the brake pads are to be removed after having been used for some period of time, the brake pad assembly may be removed by pulling the brake pad backing plate away from the last set of tabs described above and then pivoting the pad assembly away so that it may be removed from the first set of tabs described above. The piston and the planar body spring need not be removed from the caliper assembly.

IN THE DRAWING

Figures 1, 2, 3, 4, 5:
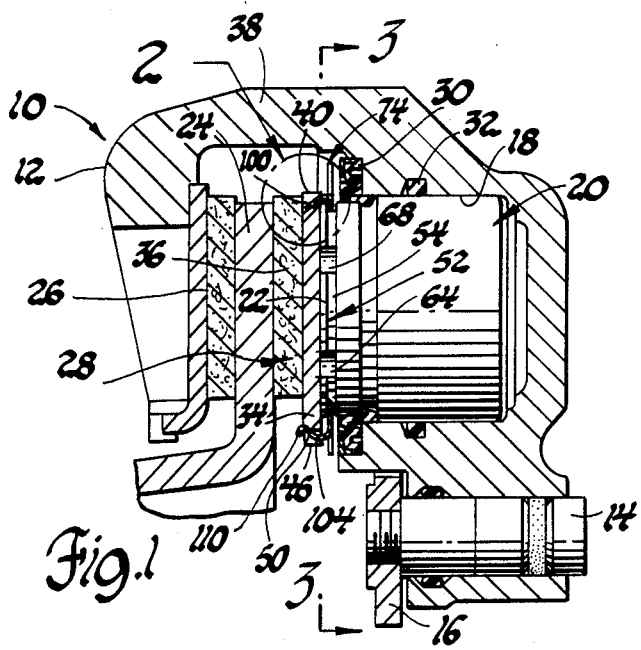
FIG. 1 is a cross-section view of a disc brake caliper assembly embodying the invention, with parts broken away and in section.
FIG. 2 is a fragmentary enlarged view of a portion of the caliper assembly of FIG. 1 taken in the area defined by the arrowed circle 2.
FIG. 3 is an elevation view of the spring and piston subassembly taken in the direction of arrows 3—3 of FIG. 1 and illustrating the subassembly in the fully assembled condition.
FIG. 4 is a view similar to that of FIG. 3 but showing the spring portion of the subassembly in pre-assembly alignment with the piston before the bayonet joint is locked.
FIG. 5 is a somewhat schematic representation of the piston and brake pad assembly showing the brake pad assembly in process of being installed.

The disc brake caliper assembly 10 includes a caliper housing 12 slidably mounted on one or more support pins 14 to a fixed support member 16. The caliper assembly includes a cylinder 18 formed in the caliper housing 12 and containing a brake actuating piston 20, the outer end 22 of the piston extending toward the disc 24 to be braked. An outboard brake pad assembly 26 is suitably mounted on the outer leg of the caliper housing 12 and an inboard brake pad assembly 28 is mounted on the outer end 22 of piston 20. The particular arrangement of the inboard brake pad assembly and piston mounting arrangement is the subject of the invention herein disclosed and claimed. The piston is provided with a dust seal 30 which is secured to the piston adjacent to but axially inboard of the piston outer end. Seal 30 extends radially outwardly around the piston so as to be mounted within a suitable portion of the caliper housing 12 near the open end of cylinder 18, in a manner generally well known in the art. The piston also has a piston seal 32 mounted within a groove of the cylinder 18 and engaging the outer peripheral surface of piston 20 to contain the hydraulic brake fluid imposed within cylinder 18 to act on the piston during brake actuation and also to provide some retracting action of the piston, also well known in the art. The general arrangement of the disc brake caliper assembly 10 described above, except for the assembly including the outer end of the piston, the brake pad assembly and the arrangement for mounting the brake pad assembly to the piston, as well as providing a shield for the dust seal 30, are well known in the art and disc brakes of this general arrangement have been used on production vehicles in the United States for some years.

Referring more specifically to the various elements involved in the invention herein disclosed and claimed, the inboard brake pad assembly 28 is composed of a planar backing plate 34 on one side of which is secured a pad 36 of friction material in the assembled position shown in FIG. 1. The pad 36 is positioned so as to engage one side of the disc 24 for braking action, and the friction pad of the outboard brake pad assembly 26 is similarly positioned on the other side of the brake disc. For convenience, the position of the caliper assembly shown in FIG. 1 will be referred to as if the caliper assembly were mounted vertically, so that the support pin 14 is at the lower part of the caliper assembly and the caliper housing bridge 38 is at the upper part of the assembly. It is recognized that in practice the disc brake caliper assembly is not necessarily mounted in such a vertical position, but may be mounted in any other position located circumferentially about the disc to be braked.

The upper edge 40 of backing plate 34 is provided with edge sections arranged in spaced relation, two such edge sections being provided in the particular arrangement disclosed and one such edge section 42 being illustrated in FIGS. 1, 2 and 5. These edge sections are defined by notches in the upper edge 40 and include ramp surfaces 44 which slope inwardly of the backing plate and to the surface of the backing plate on which the friction pad 36 is secured. The lower edge 46 of the backing plate 34 is provided with similar edge sections 48 defined by notches in the lower edge and formed with ramp surfaces 50 which similarly slope inwardly of the backing plate to the surface on which the friction pad 36 is secured.

Piston 20 has a bayonet joint portion 52 on its outer end 22 and axially between the end surface of the outer end and the circumferential location of dust seal 30 on the piston. Bayonet joint portion 52 includes a circumferentially extending groove 54 defined by an outer side wall 56, an inner side wall 58 and a groove bottom 60. Bayonet joint recesses 62 and 64 are formed so as to extend axially through the outer side wall 56 of groove 54 and are preferably positioned diametrically opposite each other. Similar bayonet joint recesses 66 and 68 are similarly formed through outer side wall 56 and are also preferably positioned diametrically opposite each other so that the diameters on which recesses 62, 64 and recesses 66, 68 resepectively lie form obtuse angles rather than being at right angles, the obtuse angles so formed opening upwardly and downwardly relative to the assembly as viewed in FIGS. 1, 3 and 4. The end surface of the piston outer end 22 may be provided with appropriate depressions so that the area of the end surface is substantially less than the total end area of the piston, thereby minimizing the amount of surface contact that the piston outer end has with the backing plate 34 and restricting the heat flow path from the backing plate to the piston so that heat flow from the brake pad assembly to the piston is minimized. In the particular example illustrated, the piston outer end 22 has an outer circumferential surface contact area 70 which includes the outer side surface of outer side wall 56, and an inner annular surface contact area 72. Contact areas 70 and 72 are positioned in a common plane so that they may engage the side of backing plate 34 as earlier described.

Spring 74 is formed with a planar body 76 having an opening 78 extending therethrough which has a diameter slightly greater than the outer peripheral diameter of groove outer side wall 56. Bayonet joint fingers 80, 82, 84 and 86 define bayonet joint portion 88 as a part of the planar body 76 of spring 74. These fingers extend into opening 78 so that their inner ends are on a circle having a diameter which is at least as large as the diameter of groove bottom 60 but is less than the diameter of the outer peripheries of groove side walls 56 and 58. Fingers 80 and 82 are preferably diametrically opposed, as are fingers 84 and 86. The fingers are preferably arranged so that their diameters also form obtuse angles as seen in FIG. 4 which open upwardly and downwardly as viewed in that Figure. As viewed in FIG. 3, the diameters on which the fingers are located preferably form acute angles which open upwardly and downwardly as seen in that Figure. Fingers 80, 82, 84 and 86 are so configured that when they are axially aligned with bayonet joint recesses 62, 64, 66 and 68 they may pass axially through those recesses so as to be located within groove 54. This position is illustrated in FIG. 4 wherein bayonet joint finger 80 is positioned in axial alignment with bayonet joint recess 62, bayonet joint finger 82 is positioned in axial alignment with bayonet joint recess 64, bayonet joint finger 84 is positioned in axial alignment with bayonet joint recess 66, and bayonet joint finger 86 is positioned in axial alignment with bayonet joint recess 68. Spring 74 may then be rotated in the clockwise direction as seen in FIG. 4 until it assumes the position illustrated in FIG. 3 wherein the bayonet fingers 80, 82, 84 and 86 are axially retained within groove 54 by the groove inner and outer side walls 56 and 58. As illustrated, the amount of rotation is approximately 90°. It is within the contemplation of the invention however, that various angular displacements for locking the spring 74 to the piston 20 may be used. If desired, a suitable stop may be provided within groove 54 to limit the amount of rotation.

The planar body 76 of spring 74 is formed so as to extend radially beyond the piston and provide a shield for dust seal 30. While such planar body radial extension of spring 74 may be made in any of several suitable configurations, the particular configuration illustrated has four shield extensions 90, 92, 94 and 96 which extend well beyond the diameter of piston 20, even at the areas where adjacent shield extensions join each other. As can be seen in FIG. 1, the shield extensions provide a heat shield which protects the dust seal 30 from heat radiated by the brake assemblies 26 and 28 as well as heat radiated by disc 24 during braking action and thereafter as the brake is cooling down. It also provides an effective shield to minimize the likelihood of dust seal 30 being injured by any debris that may be thrown up from the road surface, such as gravel, broken glass, metal particles, or any other similar material that may be found on the roadway on which the vehicle containing the brake assembly is traveling. Spring 74 also has spaced first and second sets of spring tabs formed from planar body 76. The first set of such tabs is provided by tabs 98 and 100. As shown on the particular spring illustrated, they are formed from portions of shield extensions 92 and 94 and are positioned on either side of shield extension 90. The second set of spring tabs is defined by tabs 102 and 104, which are similarly provided so that they are on either side of shield extension 96. The first set of spring tabs are positioned on the opposite side of opening 78 from the second set of spring tabs and all of the tabs are spaced radially outwardly from the opening. As can be clearly seen in FIGS. 1, 2 and 5, the spring tabs 98 and 100 extend axially away from the planar body 76 and slope radially inward as well as extend axially away from the planar body, each terminating in an end 106 which forms a gripping and pivotal edges 108. When the brake pad assembly is in the installed position on piston 20, the tab gripping and pivotal edges 108 of each of tabs 98 and 100 engage their corresponding ramp surfaces 44 formed on backing plate 34 so that the spring tabs grip the backing plate and resiliently urge the backing plate toward engagement with the outer end surface of piston 20. The second set of spring tabs formed by tabs 102 and 104 are formed so that they extend axially and curvilinearly in a general S-shape and terminate in an end 110 so that each tab forms a spring-biased retainer. When the brake pad assembly 28 is in the installed position on piston 20, as illustrated in FIG. 1, tabs 102 and 104 extend through their corresponding edge sections so that their ends 110 engage the ramp surfaces 50 and resiliently urge the backing plate toward engagement with the outer end of piston 20. When in the installed position illustrated in FIG. 1, spring 74 will mount and hold the brake pad assembly 28 in brake force transmitting position on the piston 20.

The brake pad assembly 28 may be removed from spring 74 and piston 20 by removing the caliper assembly 10 from the fixed support 16 so that disc 24 no longer is positioned between the brake pad assemblies 26 and 28. Brake pad assembly 28 is installed and removed in a manner illustrated in FIG. 5. When the brake pad assembly 28 is being installed, the notches forming its upper edge sections 42 are aligned with the first set of tabs 98 and 100 and the backing plate is moved upwardly so that the tab ends 108 engage the ramp surfaces 44 as shown in FIG. 5. The tab edges 108 then act as pivotal edges as the brake pad assembly, and particularly backing plate 34, is pivoted so that the second set of spring tabs 102 and 104 extend through the backing plate edge sections aligned therewith and snap over the ramp surfaces 50 to hold the backing plate in resilient but firm engagement with the outer end surface of piston 20. To remove the brake pad assembly 28, this operation is reversed. The brake pad assembly is first snapped out of engagement with the second set of spring tabs 102 and 104 and then may be moved out of engagement with the first tabs and removed from the piston and spring.

The spring retaining action of the first and second sets of tabs will hold the backing plate 34 relatively tightly against the piston outer end surface so that the bayonet fingers 80, 82, 84 and 86 engage the groove outer side wall 56 and are slightly spaced from the groove inner side wall 58. This spring retention action not only holds the brake pad assembly 28 in the proper position but also acts to prevent brake pad assembly rattle within the caliper assembly as the vehicle travels over rough roads.

The embodiments of the invention in which an exclusive property or privilege is claimed are defined as follows:

1. A disc brake piston and brake pad assembly comprising:
    a brake pad assembly having a planar backing plate and a friction pad secured to one side of said planar backing plate;
    a piston having on the outer end thereof a first bayonet joint portion;
    a spring formed with a planar body and having an opening therethrough with a plurality of circumferentially spaced lugs around and extending into said opening and defining a second bayonet joint portion, said second bayonet joint portion mating with said piston first bayonet joint portion so as to be arcuately rotatable relative thereto in one direction to lock said spring planar body to said piston and in the other direction to unlock said spring planar body from said piston, said spring planar body when locked to said piston being mounted on the piston outer end;
    said spring further having spaced first and second sets of spring tabs formed from said planar body, each of said tabs extending axially away from and concurrently radially inward of said planar body, said spring tabs receiving and gripping the edges of said planar backing plate and holding said backing plate in planar engagement with the piston outer end in braking force transmittable relation, said spring thus mounting and locating said brake pad assembly on said piston.

2. A disc brake piston and brake pad assembly comprising:
    a brake pad assembly having a planar backing plate and a friction pad secured to one side of said planar backing plate;
    a piston having on the outer end thereof a first bayonet joint portion and an annular dust seal secured to said piston adjacent to but axially spaced inwardly from said first bayonet joint portion and extending radially outward from said piston;
    a spring formed with a planar body and having an opening therethrough with a plurality of circumferentially spaced lugs around and extending into said opening and defining a second bayonet joint portion, said second bayonet joint portion mating with said piston first bayonet joint portion so as to be arcuately rotatable relative thereto in one direction to lock said spring planar body to said piston and in the other direction to unlock said spring planar body from said piston, said spring planar body when locked to said piston being mounted on the piston outer end and extending radially beyond said piston to provide a shield for said dust seal;
    said spring further having spaced first and second sets of spring tabs formed from said planar body, each of said tabs extending axially away from and concurrently radially inward of said planar body, said spring tabs receiving and gripping the edges of said planar backing plate and holding said backing plate in planar engagement with the piston outer end in braking force transmittable relation, said spring thus mounting and locating said brake pad assembly on said piston.

3. A disc brake piston and brake pad assembly comprising:
    a brake pad assembly having a planar backing plate and a friction pad secured to one side of said planar backing plate;
    a piston having on the outer end thereof a first bayonet joint portion;
    a spring formed with a planar body and having an opening therethrough with a plurality of circumferentially spaced fingers around and extending into said opening and defining a second bayonet joint portion, said second bayonet joint portion mating with said piston first bayonet joint portion so as to be arcuately rotatable relative thereto in one direction to lock said spring planar body to said piston and in the other direction to unlock said spring planar body from said piston, said spring planar body when locked to said piston being mounted on the piston outer end;
    said spring further having spaced first and second sets of spring tabs formed from said planar body and positioned on opposite sides of said opening and spaced radially outwardly from said opening;
    each spring tab of said first set of spring tabs extending axially away from and then sloping radially inward and axially away from said planar body and terminating in an end forming a gripping and pivotal edge, each spring tab of said second set of spring tabs extending axially and curvilinearly in a general S-shape from said planar body and terminating in an end forming a spring-biased retainer;
    said backing plate having notches defining edge sections in matable relation with said tabs and formed with ramp surfaces sloping inwardly toward and to the side of said backing plate on which said friction pad is secured;
    said first set of spring tabs cooperating with the edge sections matable therewith to receive said edge sections and engage said gripping and pivotal edges with said edge section ramps, said backing plate then being pivotally movable about said gripping and pivotal edges to engage the piston outer end with the side thereof opposite said friction pad, said second set of spring tabs receiving said edge section matable therewith and said tab ends engaging said edge section ramps in spring biased retaining relation to mount and hold said brake pad assembly in braking force transmitting position on said piston, said brake pad assembly being removable by reversing the operation.

* * * * *